Patented Nov. 15, 1949

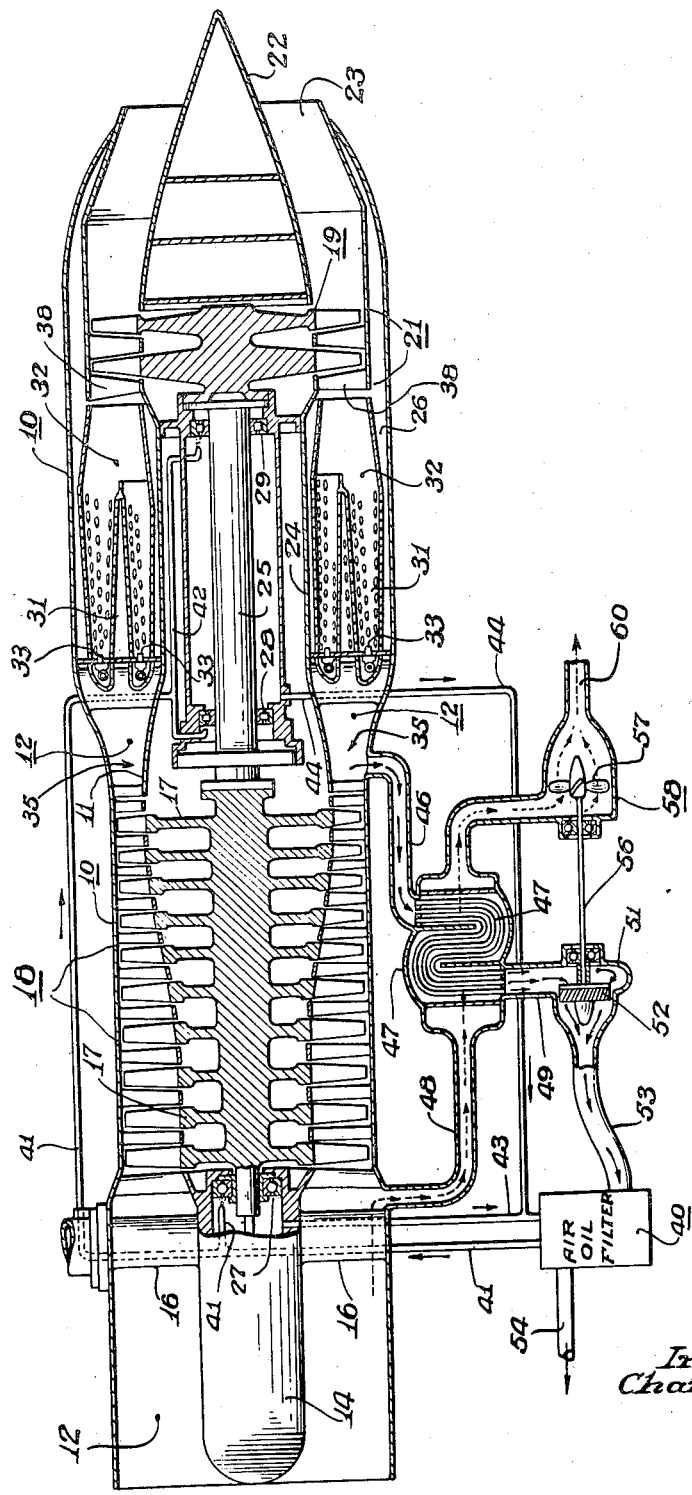

2,487,842

UNITED STATES PATENT OFFICE 2,487,842

AIRCRAFT POWER PLANT APPARATUS

Irvin Whiteman, Philadelphia, Pa., and Charles C. Davenport, Los Angeles, Calif., assignors to Westinghouse Electric Corporation, East Pittsburgh, Pa., a corporation of Pennsylvania Application March 9, 1948, Serial No. 13,828

9 Claims. (Cl. 230—207)

1

This invention relates to power plants, more particularly to lubrication systems therefor, and has for an object to provide improved apparatus of this character.

Another object of the invention is to provide novel apparatus for maintaining the lubricant of a power plant at suitable temperatures.

In aircraft powered by gas turbine plants where combustion air is received through a forwardly-directed inlet, the ram pressure on the entering air at high flight speeds may be so great as to raise the temperature of the entering air to a degree rendering it unsuitable for use as a cooling medium for lubricant in the power plant lubrication system. Consequently, if a portion of this air is to be utilized as a medium for absorbing heat from the power plant lubricant, it must be cooled to provide the necessary temperature differential relative to the lubricant.

To this end, the present invention provides an air-lubricant cooler in the lubrication system of an aircraft power plant, together with a conduit for passage of compressed air from the plant to the cooler. The necessary reduction in cooling air temperature is effected by either a heat exchanger cooled by inlet air, or by expansion of the compressed air through an expansion device, such as an air turbine, or by a combination of the two.

Therefore, a further object of the present invention is to provide means for reducing the temperature of air to a degree rendering it suitable for use as a cooling medium for an air-lubricant cooler.

Another object of the invention is to provide an air-cooling system wherein the air to be cooled is caused to perform work by motivating an air turbine, thereby losing heat.

While air cooling means of the character hereinafter disclosed will be found useful in many situations and types of apparatus, they are particularly useful in gas turbine power plants for aircraft propulsion.

A typical power plant of the type referred to is disclosed in U. S. Letters Patent No. 2,405,723, granted August 13, 1946 to the assignee of the present application, wherein there is described a gas turbine power plant for propulsion of aircraft, and includes an air compressor, air heating apparatus, a turbine, and a propulsion jet nozzle all housed within a streamlined tubular casing. A plant of this character is particularly suitable for propelling aircraft at high speeds and operates generally as follows: Air enters the forward end of the tubular casing and is com-

2 pressed in the compressor, the compressed air is then heated in the heating apparatus by combustion of fuel, supported by the compressed air. The resulting motive fluid, comprising the products of combustion and the excess compressed air, drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by suitable means, for example, a positive displacement pump which is preferably driven by the turbine.

These and other objects are effected by the invention as will be apparent from the following description and claims taken in connection with the accompanying drawings, forming a part of this application, in which the single figure is a longitudinal sectional view of apparatus embodying the present invention.

The power plant shown in the figure comprises, in general, an outer casing structure 10, open from end to end, and having a central core structure 11 providing an annular flow passage 12, which extends fore and aft with respect to the aircraft in which it is mounted. The central core structure 11 is supported by the casing structure along its longitudinal axis and includes a hollow fairing cone 14 defining with the forward or left end of the casing 10, as viewed in the figure, the inlet portion of the flow passage 12. The fairing cone may house a fuel pump (not shown), and other auxiliary apparatus, and is supported from the casing by hollow compressor guide vanes 16. The core structure also includes the rotor 17 of an axial-flow compressor 18, the rotor 19 of a turbine 21, and a conical tailpiece 22 which defines, with the rear end of the casing structure, a propulsion nozzle 23. The intermediate portion of the core structure between the compressor and the turbine comprises an inner wall structure 24, which houses a shaft 25 connecting the turbine rotor 19 and compressor rotor 17, and defines with the casing 10 an annular combustion chamber 26. The shaft 25 is journaled in suitable bearings 27, 28 and 29.

The combustion chamber 26 is provided with a suitable burner or burners, such as shown in the copending application of Way et al., Serial No. 511,468, filed November 23, 1943, for heating the air compressed by the compressor. In the embodiment shown herein, a perforated, tapered, double annular burner 31 is mounted in the annular combustion chamber 26 with its large open end 32 directed downstream. Fuel under pressure is supplied to the burner from a fuel supply through atomizing nozzles 33 extending into the burner through the small closed upstream end thereof.

The power plant operates substantially as follows: Air enters the casing 10 at the inlet of the flow passage 12, is compressed by the compressor, and flows into a diffuser or divergent portion 35 of the flow passage, which effects a further compression of the air. The compressed air then passes through openings provided in the walls of the burner tube 31. The compressed air mixes with the fuel atomized in the tube by the nozzles 33. The air and fuel mixture is ignited and burns steadily thereafter. The hot gases or motive fluid comprising the products of combustion and the excess air heated by the combustion, on leaving the burner tube 31 are directed by fixed guide vanes or nozzles 38, of the turbine 21, into the blade passage of the turbine rotor 19. The turbine extracts at least sufficient energy from the motive fluid to drive the compressor 18 and other auxiliary apparatus. The spent gases leaving the turbine are discharged through the propulsion nozzle 23 at a high velocity, so that the remaining energy in the motive fluid is available to propel the aircraft.

The present invention is concerned with the lubrication system for the bearings 27, 28 and 29, and more particularly with the means for cooling the lubricant so that it may have the desired lubricating and cooling effects on the bearings.

As illustrated in the drawings, the lubrication system includes an air-lubricant cooler 40 which may be of sufficient size to constitute a reservoir, having a supply communication 41—42 for flow of lubricant therefrom to the bearings 27, 28 and 29, and a return communication 43—44 for flow of lubricant from the bearings to the cooler 40.

Inasmuch as the coolest air available within the power plant for cooling the lubricant will, due to ram effect, be too hot for this purpose under certain conditions of operation, the present invention provides a duct 46 for withdrawing a small portion of the air compressed by the compressor 18 and directing it to a heat exchanger 47 where it passes in heat-exchange relation to cooler air supplied thereto from the compressor inlet by the duct 48.

On leaving the heat exchanger 47, the compressed air passes through duct 49 to an air turbine 51 where it constitutes the motive fluid for driving the turbine. In expanding through the blading 52 of the turbine 51 the compressed air expands and is further cooled to a temperature suitable for cooling the lubricant in the air-lubricant cooler 40, to which it flows through the duct 53 and from which it exhausts to the atmosphere through outlet 54.

The turbine 51 is connected by shaft 56 with the impeller 57 of a blower 58 which functions to promote flow of cooling air from the turbine inlet through the duct 48, the heat exchanger 47 and discharge ducts 59 and 60. Thus, the blower 58 constitutes a load on the turbine 51, causing the latter to remove heat energy from the air driving the air turbine.

While the invention has been shown in but one form, it will be obvious to those skilled in the art that it is not so limited, but is susceptible of various changes and modifications without departing from the spirit thereof.

What is claimed is:

1. In a power plant for propulsion of aircraft, an air compressor including a rotary element, an engine for driving said compressor and including a rotary element, a plurality of bearings for the rotary elements of said compressor and engine, an air-lubricant cooler means for supplying lubricant from said air-lubricant cooler to said bearings and for returning lubricant from said bearings to said air-lubricant cooler, means for passing air compressed by said compressor through said air-lubricant cooler in heat-exchange relation to lubricant therein to cool the latter, and means for cooling said compressed air prior to its passage through said air-lubricant cooler.

2. Structure as specified in claim 1, wherein the last-mentioned means comprises a heat exchanger in which air uncompressed by the compressor passes in heat exchange relation to the compressed air passing to the air-lubricant cooler to cool the latter air.

3. Structure as specified in claim 1, wherein the last-mentioned means comprises an expansion chamber in which the compressed air passage to the air-lubricant cooler is expanded and thereby cooled.

4. Structure as specified in claim 1, wherein the last-mentioned means comprises a heat-exchanger through which said compressed air is passed in heat-exchange relation to a cooling medium to reduce its temperature and means defining an expansion chamber in which said compressed air is further cooled by expansion.

5. In a power plant for propulsion of aircraft, a compressor including a rotary element, a turbine for driving said compressor and including a rotary element, a plurality of bearings for said rotary elements, means providing an inlet duct for passage of air to said compressor for compression thereby, means providing an outlet from said compressor for air compressed thereby, a first heat exchanger, means providing a communication between said inlet duct and said heat exchanger for flow of cooling air through the latter from the former, means providing a communication between said outlet and said heat exchanger for flow of compressed air from the former through the latter in heat-exchange relation to the cooling air, a second heat exchanger, means providing a communication between said heat exchangers for flow of cooled compressed air from said first heat exchanger to and through said second heat exchanger, means providing a communication between said second heat exchanger and the bearings and between said bearings and said second heat exchanger, whereby hot lubricant from the bearings may flow to said second heat exchanger and be cooled by passing therethrough in heat-transfer relation to the cool air, and cooled lubricant may flow from the second heat exchanger to the bearings.

6. In a power plant for propulsion of aircraft, a compressor including a rotary element; an engine for driving said compressor and including a rotary element; a plurality of bearings for said rotary elements; means providing an inlet duct for passage of air to said compressor for compression thereby; means providing an outlet from said compressor for air compressed thereby; a lubrication system for said bearings and including a lubricant cooler, a first communication for flow of cooled lubricant from said lubricant cooler to said bearings, and a second communication for flow of heated lubricant from said bearings to said lubricant cooler; a conduit for flow of air from the compressor outlet to said lubricant cooler for cooling lubricant in the latter; and means interposed in said conduit for cooling air from the compressor outlet prior to its passage through the lubricant cooler.

7. Structure as specified in claim 6, wherein the last-mentioned means comprises a heat exchanger and means for passing air from the compressor inlet through said heat exchanger in heat-exchange relation to the air passing from the compressor outlet to the lubricant cooler.

8. Structure as specified in claim 6, wherein the last-mentioned means comprises an air turbine motivated by the cooling air passing from the compressor outlet to the lubricant cooler, and means for loading said air turbine.

9. Structure as specified in claim 8, including a heat exchanger disposed in the flow path of air from the compressor outlet to the lubricant cooler, means for passing air from the compressor inlet through said heat exchanger in heat-exchange relation to the air to the lubricant cooler, and a blower for moving air from the compressor inlet through said heat exchanger, said blower being driven by, and providing a load for, the air turbine.

IRVIN WHITEMAN.
CHARLES C. DAVENPORT.

REFERENCES CITED

The following references are of record in the file of this patent:

UNITED STATES PATENTS

| Number | Name | Date |
|---|---|---|
| 2,435,990 | Weiler | Feb. 17, 1948 |

OTHER REFERENCES

Fig. 2 of article entitled "Air Conditioning Turbine-Propelled Aircraft," "Aviation," for February 1947, pages 49 to 52 inclusive.

Certificate of Correction

Patent No. 2,487,842 November 15, 1949

IRVIN WHITEMAN ET AL.

It is hereby certified that error appears in the printed specification of the above numbered patent requiring correction as follows:

Column 4, line 24, for the word "passage" read *passing*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*